June 21, 1949.　　　C. HOLLERITH　　　2,473,645

STEERABLE TAIL WHEEL

Filed April 22, 1946

Inventor

CHARLES HOLLERITH

By Beaman + Langford

Attorneys

Patented June 21, 1949

2,473,645

UNITED STATES PATENT OFFICE 2,473,645

STEERABLE TAIL WHEEL

Charles Hollerith, Jackson, Mich., assignor, by mesne assignments, to The B. F. Goodrich Company, Akron, Ohio, a corporation of New York Application April 22, 1946, Serial No. 663,991

6 Claims. (Cl. 244—50)

The present invention relates to improvements in full swivel steerable tail wheels for aircraft and the like.

An object of the invention is to provide a wheel of the aforesaid type which may be inexpensively fabricated yet is durable in construction.

Another object is to provide a steerable, full swivel tail wheel in which simple castings and stampings may be utilized in its fabrication.

Further objects and advantages are deemed to reside in the combination of parts in their specific construction and arrangement, all as more fully disclosed hereinafter and covered by the appended claims.

Figure 1:
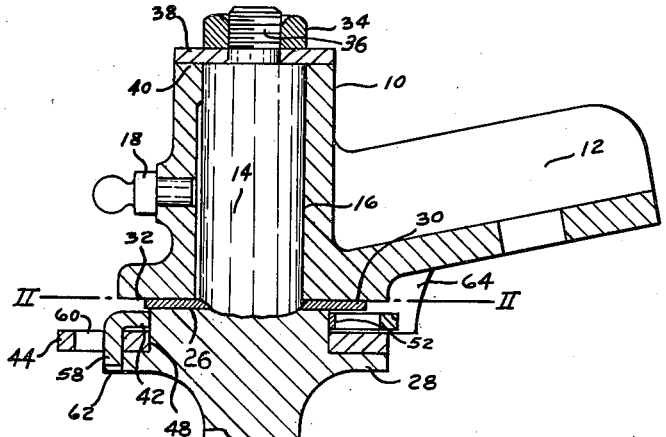
Fig. 1 is a side elevational view partly shown in vertical cross section.

In the illustrated form of the invention, the cast housing 10 has an attachment bracket portion 12 for mounting the steerable tail wheel on the aircraft structure in a well-known manner. The post 10 is supported for rotation in a vertical bore 16, being lubricated by the grease-gun fitting 18.

Integral with the post 14 is the caster arm 20 having the wheel 22 supported for rotation on the axis 24. As shown, annular shoulders 26 and 28 are provided between the post 14 and the arm 20. A thrust washer 30 on the shoulder 26 is held against the bottom 32 of the casting 10 by the tightening of the nut 34 located on the reduced threaded portion 36 of the post 14 against the washer 38 which bears against the upper surface 40 of the casting 10.

Figure 2:
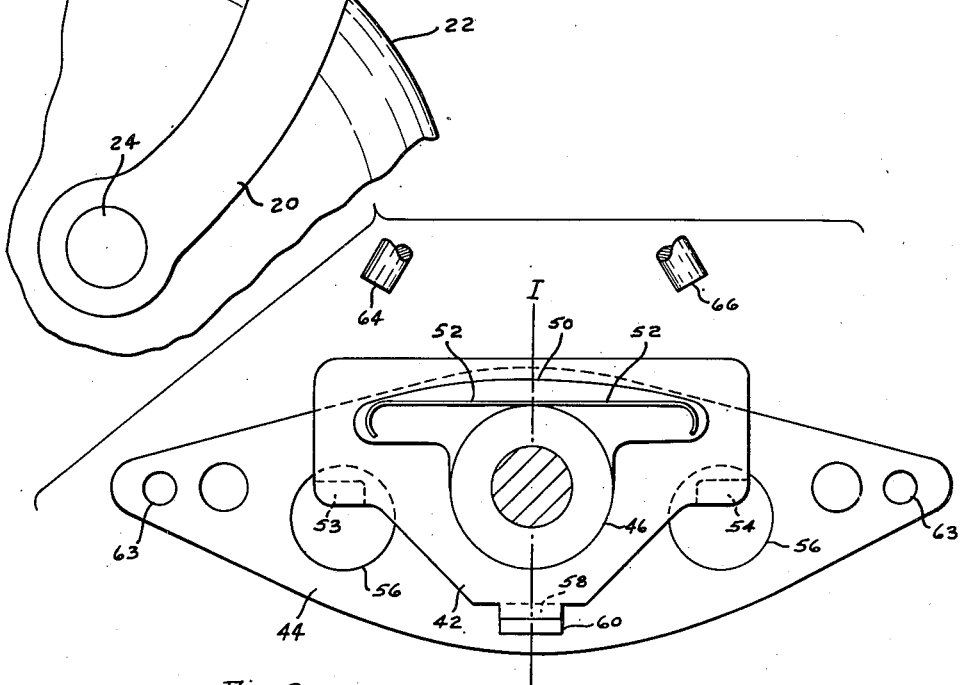
Fig. 2 is a view taken on line II—II of Fig. 1.

Supported on a shoulder 28 are upper and lower latch plates 42 and 44 in the form of sheet metal stampings. As more clearly shown in Fig. 2, the plate 42 has a semi-circular portion 46 which is piloted on the vertical annular shoulder 48, and merges with an elongated opening 50 in which the spring 52 is located. At opposite corners of the plate 42 are tabs 53 and 54 which are turned downwardly to project through the openings 56 in the lower latch plate 44. Intermediate with the tabs 54 is a locking tab or key 58 which projects through the slot 60 in the lower plate 44 to engage with the radial notch 62 of the shoulder 28.

The operation of the structure above-described follows:

Cables operated in unison with the rudder of the aircraft are connected at 63 to the plate 44. To steer the tail wheel, one or the other of the cables is tensioned to swing the plate 44 through the steering arc. With the locking tab 58 engaged in the notch 62, this movement of the plate 44 will impart similar movement to post 14.

Where full caster or swivel action of the post 14 is desired, as when the aircraft is being parked in the hangar, engagement between the stops 64 or 66 on the bracket 12 will force the locking tab 58 out of the notch 62 to enable the post 14 to swivel completely around its axis. For example, clockwise movement of the plate 44 by the tensioning of the cables will bring the plate 42 into abutting relationship with the stop 64. If the tail wheel is forced to swivel thereafter, the plate 42 is fulcrumed about the tab 54, stressing the spring 52 and forcing the locking tab 8 out of the notch 62. It will be noted that the slot 60 has sufficient clearance with the tab 58 to permit this movement. With the shoulder 28 declutched from the plates 42 and 44, the post 14 is free to full swivel. The tension of the spring 52 will again reclutch the tab 58 and the notch 62 when the parts are rotated into the position shown in Fig. 2. Counter-clockwise movement of the plate to engage the stop 66 will result in the tab 53 acting as a fulcrum and declutching will take place in the same manner as described upon clockwise movement.

Having thus described my invention, what I claim is new and desire to be covered by Letters Patent is:

1. A full swivel steerable tail wheel assembly, comprising a wheel bracket including a vertical post, a fixed body in which said post is supported for full swivel movement, a pair of superimposed apertured relatively flat plates concentrically arranged and supported upon said bracket and post, one of said plates having steering connections to oscillate the same in a substantial arc, means providing a drive between said plates, a drive connection between the other of said plates and said bracket for oscillating said bracket through said arc, fixed abutment means engaging with said other plate upon oscillation within the limits of said arc, said other plate being bodily shiftable by said first plate following engagement with said abutment means to break said drive connection with said bracket, to permit said bracket to full swivel, and continuously acting spring means for re-establishing said drive connection with the driven part of said bracket located in said arc.

2. A full swivel steerable tail wheel assembly, comprising a wheel bracket having a vertical post, an attachment bracket including a housing in which said post has full swivel mounting, steering members supported on said wheel bracket concentric to the said post and having a driving slot therein, a driver plate imposed on said first plate and having the driver part extending through said slot, a driving slot in said wheel bracket, a fixed abutment with which said driver plate engages, a lost-motion connection between said driver part and the slot of said steering member to permit relative movement between said steering member and said driver plate, continued movement of said steering member following engagement of said driver with said abutment causing relative movement of said driver part and said first slot, said driver part engaging with said wheel bracket slot, with said driver plate out of engagement with said abutment, to establish the driving connection between said steering member and said wheel bracket.

3. A full swivel steerable tail wheel assembly, comprising a wheel mounting structure, fixed structure to which said mounting is supported for full swivel action, abutment means on said fixed structure, a steering member supported for oscillation within a certain arc for steering the said wheel mounting structure, a drive member supported for oscillation through a lesser arc, the limits of which are predetermined by said abutment means with which said drive member engages, means supporting said member for oscillation about the swivel axis of said mounting structure a drive connection between said steering member and said drive member, a drive connection between said drive member and said wheel mounting structure, said means including a resilient support for said drive member for providing unitary movement about said axis with said steering member upon oscillation within the limits of said lesser arc, said resilient support yielding to movement of said steering member beyond said lesser arc with said drive member engaging said abutment means to move said drive member relative to said steering member about a pivot to one side of said axis to render the driving connection between said drive member and said mounting structure inoperative to enable the latter to fully swivel engageable parts on said members constituting a pivotal connection to one side of said axis, said resilient means continuously acting to render said last-mentioned driving connection operative with said steering member in said mounting structure operating within said lesser arc.

4. A full swivel steerable tail wheel assembly, comprising a wheel mounting structure, fixed structure on which said mounting is supported for full swivel action, a steering and releasable drive mechanism, including a pair of super-imposed parts, resilient means for supporting one of said parts both for unitary movement upon oscillation about the axis of rotation of said mounting structure through a lesser arc and for pivotal movement to one side of said axis when said mounting structure is operated through a greater arc, a steering connection for operating one of said parts through a greater arc, abutment means associated with said fixed structure with which said other part engages to the limit of said lesser arc, said resilient means permitting drive releasing relative movement between said parts upon movement of said first part beyond the limits of said lesser arc, and a driving connection between said other part and said wheel mounting structure, released by relative movement between said parts and re-established by said resilient means upon re-alignment of said other parts in said wheel mounting structure and in said lesser arc means constituting a pivotal connection between said parts to one side of said axis.

5. A full swivel steerable wheel assembly comprising a wheel mounting structure, fixed structure in which said mounting structure is supported for full swivel action, a steering member, a latch member, means on said latch member for locking steering member to said mounting structure to steer the wheel, supporting structure for said latch member including resilient means for urging said first means into a locking position, fixed abutments with which said latch member engages at the limits of a predetermined arc of rotation of said mounting structure about its swivel axis, and means constituting shiftable pivotal connections between said members about which said latch member pivots upon engagement with said abutments to move said locking means out of locking engagement with said steering member to permit said mounting structure to swivel.

6. A full swivel steerable wheel assembly comprising a fixed structure, a wheel mounting structure including a post supported in said fixed structure for full swivel action, a steering member, a latch member for releasably connecting said steering member to said post having a part removable with said latch member into driving relation between said steering member and said post, resilient means urging said latch member and said part into driving position and supporting said latch member lateral movement relative to said post, abutments on said fixed structure with which said latch member engage at the limits of a predetermined arc of swivel of said mounting structure, and parts on said members constituting shiftable pivotal connections about which said latch member pivots upon engagement with said abutments to move latch member out of driving relation to release said mounting structure to full swivel action.

CHARLES HOLLERITH.

REFERENCES CITED

The following references are of record in the file of this patent:

UNITED STATES PATENTS

| Number | Name | Date |
|---|---|---|
| 2,114,839 | Gwinn | Apr. 19, 1938 |
| 2,338,572 | Corwin | Jan. 4, 1944 |